April 8, 1952  H. L. SCHMALZRIED  2,592,194
STEERING MECHANISM FOR WHEELED FRAMES
Filed Oct. 22, 1948  2 SHEETS—SHEET 2
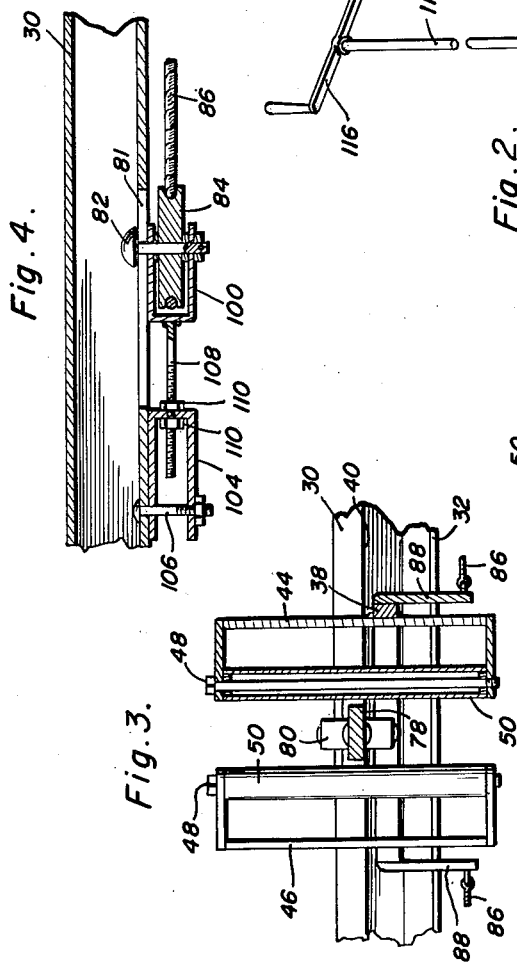
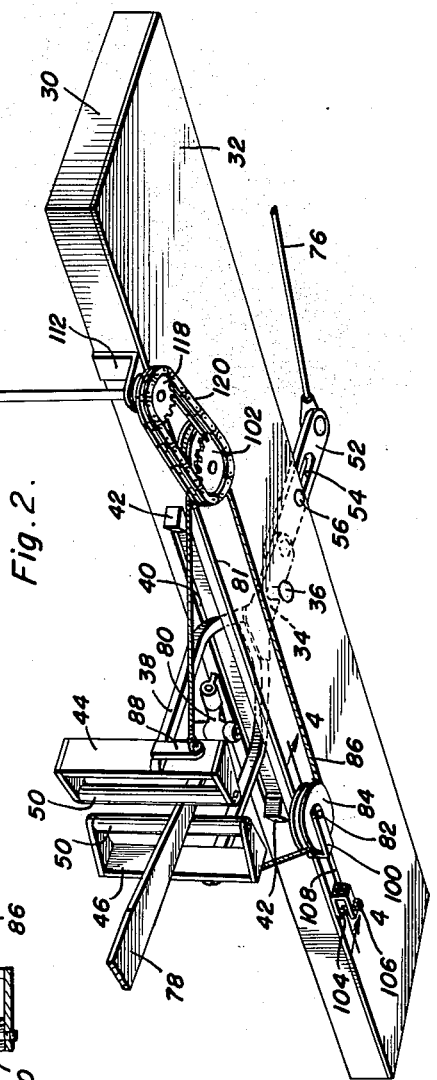
Harry L. Schmalzried
INVENTOR.

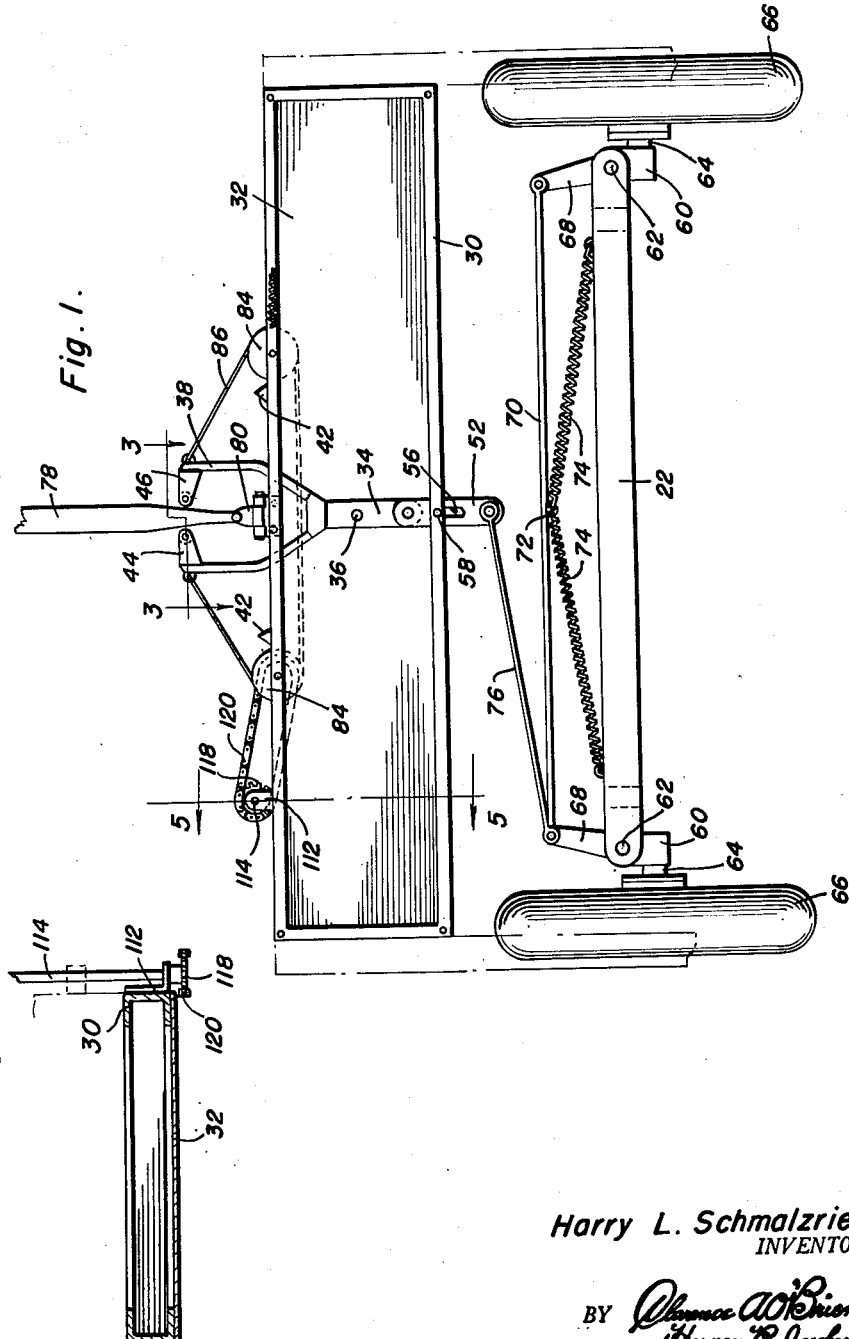
Harry L. Schmalzried
INVENTOR.

Patented Apr. 8, 1952

2,592,194

UNITED STATES PATENT OFFICE 2,592,194

STEERING MECHANISM FOR WHEELED FRAMES

Harry L. Schmalzried, North Manchester, Ind.

Application October 22, 1948, Serial No. 55,934

4 Claims. (Cl. 280—95)

This invention relates to new and useful improvements in wheeled vehicles and the primary object of the present invention is to provide a novel and improved steering mechanism for hauling and discharging machines.

Yet another object of the present invention is to provide a farm implement, trailer, or wagon including a steering mechanism and embodying novel and improved means for actuating the steering mechanism.

Another feature of the present invention is to provide a power trailer and wagon including a pair of steering wheels, a steering gear for operating the wheels and embodying means whereby the steering gear may be activated manually or by a drawbar that is applied to and responsive to the turning movement of a towing vehicle.

A still further aim of the present invention is to provide a steering mechanism of the aforementioned character that is simple and practical in construction, strong and reliable in use, small and compact in structure, neat and attractive in appearance, efficient and durable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary top plan view of the forward wheel assembly and housing for motor, the main frame removed therefrom for the convenience of explanation;

Figure 2 is a fragmentary perspective view of the bottom wall for the motor housing and illustrating the manner in which the steering mechanism is applied thereto;

Figure 3 is an enlarged transverse vertical sectional view taken substantially on the plane of section line 3—3 of Figure 1;

Figure 4 is a fragmentary longitudinal vertical sectional view of the steering mechanism taken substantially on the plane of section line 4—4 of Figure 2; and, Figure 5 is an enlarged, fragmentary longitudinal vertical sectional view taken substantially on the plane of section line 5—5 of Figure 1.

Referring now to the drawings in detail, wherein for the purpose of illustration, there is disclosed a preferred embodiment of the present invention, the numeral 22 represents a forward main wheel axle or support of a suitable wheeled frame or wagon.

The numeral 30 represents a substantially rectangular casing or frame that is suitably secured to a frame supported on the support 22.

A main link 34 is pivoted as at 36 to the bottom wall 32 and the forward end of the main link 34 is integrally formed with or rigidly secured to a yoke 38 that is slidably received in an elongated guide slot or opening 40 provided in the forward, longitudinal side of the frame 30. Suitable abutments or stops 42 are fixed to the frame 30 adjacent the ends of the slot 40 to limit the pivotal and sliding movement of the yoke 38 in the slot 40.

The ends of the yoke 38 are rigidly secured to the web portions of a pair of spaced U-shaped members 44 and 46 the leg portions of which detachably support spaced, parallel bolts 48 on which there are journaled for rotation, rollers or sleeves 50, see Figures 2 and 3.

The rear end of the main link 34 is pivoted to a pitman 52 that is slidable in an elongated opening 54 in the rear longitudinal side of the frame 30, and the pitman 52 is provided with a slot 56 at the center thereof that receives a pin 58 fixed to the frame 30.

Axle supporting blocks 60 are pivoted to vertical pins 62 depending from the support 22 and stub axles 64 project outwardly from the blocks 60 and support forward wheels 66, preferably of the pneumatic type.

Forwardly extending arms 68 are fixed to the blocks 60 and are connected by a rod 70 having its ends pivoted to the respective arms 68. The central portion of the rod 70 supports an eye 72 that receives the forwardly converging ends of a pair of coil springs 74 having their remaining ends anchored to the support 22, adjacent the ends thereof, so that the wheels 66 will be urged to a position where the same are spaced parallel to each other and in alignment with the direction of movement.

A further pitman or connecting link 76 connects the pitman 52 to one of the arms 68 and due to the rod 70, both wheels 66 will be swung simultaneously and in the same direction when the pitman 76 is moved by the pivotal movement of the yoke 38 and link 34.

A drawbar or hitching beam 78 is mounted as at 80 to the frame 30 for universal movement and between the rollers 50 so that the same will bear against a selected one of the rollers to pivot the yoke 38 and turn the wheels 66.

Extending downwardly from the forward portion of the frame 30 and slidable in slots 81 in the frame, is a pair of bolts or pivot members 82 which are spaced equidistant from the pivot point 36 and the universal hinge 80. Each of these bolts 82 supports a rotatable pulley 84 over which there is trained a length of rope, cable or the like 86 having its ends anchored to lugs 88 depending from the ends of the yoke 38.

One of the pivot pins or bolts 82 supports the leg portions of a U-shaped member 100 and the remaining of the bolts 82 supports a sprocket 102 that is suitably secured or keyed to the pulley 84 adjacent the same.

A U-shaped frame member or bracket 104 is removably secured to the frame 30 by a bolt and nut 106 and the web portion thereof is apertured to slidably receive the threaded end of a bolt 108 that is fixed to the web of the member 100, and lock nuts 110 receivably engage the threaded end of the bolt 108 and retain the same in an adjusted position relative to the bracket 104 (see Figure 4).

An angle member or journal 112 is fixed to the frame 30 and rotatably supports an upstanding steering post 114 having a suitable hand grip or wheel 116 at its upper end. The lower end of the post 114 supports a sprocket 118 that is connected to the sprocket 102 by an endless, link chain 120.

When the drawbar 78 is applied to a suitable towing vehicle, the same will be responsive to the turning movement of the towing vehicle, and hence will engage a selected one of the rollers 50 to effect a turning of the wheels 66.

It should be noted, that the post 114 and drawbar 78 may be used simultaneously when it is desired to make sharp turns or to aid the swinging movement of the yoke 38 resulting from the drawbar 78.

Having described the invention, what is claimed as new is:

1. In a machine for hauling and discharging material including a wheeled frame having a pair of steering wheels and a connecting member terminally pivoted to said steering wheels, a steering mechanism comprising a horizontally swingable member pivoted on said frame and connected to said connecting member, a pair of horizontally disposed pulleys on said frame, said member extending between said pulleys, a flexible element trained over said pulleys and terminally attached to said member, a sprocket attached to and rotatable with one of said pulleys, a second sprocket rotatably supported on said frame, a sprocket chain about said sprockets, and a steering post rising from the frame and attached at its lower end to the second sprocket.

2. The combination of claim 1 and means slidably and adjustably securing said pulleys to said frame for selectively moving the pulleys toward and away from each other.

3. The combination of claim 2 wherein said means slidably and adjustably securing said pulleys to the frame includes a pair of U-shaped members rotatably supporting the pulleys, means slidably securing the U-shaped members to the frame, anchor brackets attached to said frame, and fastening means adjustably securing said U-shaped members to said anchor brackets.

4. In a machine for hauling and discharging material including a wheeled frame having a pair of steering wheels and a connecting member terminally pivoted to said steering wheels, a steering mechanism comprising a horizontally swingable member pivoted on said frame and connected to said connecting member, a pair of horizontally disposed pulleys on said frame, said member extending between said pulleys, a flexible element trained over said pulleys and terminally attached to said member, a sprocket attached to and rotatable with one of said pulleys, a second sprocket rotatably supported on said frame, a sprocket chain about said sprockets, a steering post rotatably supported on the frame and attached at its lower end to the second sprocket for rotating the sprockets and the pulleys, a pair of U-shaped members receiving the pulleys, vertical pivots extending centrally through the pulleys and also extending through the U-shaped members, said frame including a pair of slots slidably receiving the pivots, anchor brackets secured to said frame, and threaded connections between said U-shaped members and said brackets.

HARRY L. SCHMALZRIED.

REFERENCES CITED

The following references are of record in the file of this patent:

UNITED STATES PATENTS

| Number | Name | Date |
|---|---|---|
| 507,122 | Harrington | Oct. 24, 1893 |
| 629,875 | Sattley | Aug. 1, 1899 |
| 732,215 | Packham | June 30, 1903 |
| 804,003 | Francis | Nov. 7, 1905 |
| 913,198 | Carter | Feb. 23, 1909 |
| 935,579 | Bloom | Sept. 28, 1909 |
| 1,123,158 | Allen | Dec. 29, 1914 |
| 1,140,586 | Evesson | May 25, 1915 |
| 1,169,468 | Devanney | Jan. 25, 1916 |
| 1,372,635 | Amonsen | Mar. 22, 1921 |
| 1,435,766 | Varland | Nov. 14, 1922 |
| 1,441,128 | Sloat | Jan. 2, 1923 |
| 1,725,862 | Henderson | Aug. 27, 1929 |
| 2,027,278 | LaMarsh | Jan. 7, 1936 |
| 2,144,162 | Leighton | Jan. 17, 1939 |
| 2,390,231 | Utz | Dec. 4, 1945 |
| 2,390,273 | Ronning et al. | Dec. 4, 1945 |
| 2,424,617 | Hoyle | July 29, 1947 |

FOREIGN PATENTS

| Number | Country | Date |
|---|---|---|
| 3,562 | Great Britain | Apr. 17, 1897 |
| 10,255 | Great Britain | May 17, 1901 |
| 21,890 | Great Britain | Sept. 13, 1906 |